United States Patent [19]
Meyers

[11] 3,712,176
[45] Jan. 23, 1973

[54] SHUTTLE VALVE FOR HYDRAULIC BRAKE BOOSTER WITH EMERGENCY FLUID SUPPLY

[75] Inventor: Robert E. Meyers, South Bend, Ind.
[73] Assignee: The Bendix Corporation
[22] Filed: Dec. 21, 1970
[21] Appl. No.: 99,793

[52] U.S. Cl. ............................................. 91/6, 91/33
[51] Int. Cl. ......................... F01b 25/02, F15b 13/04
[58] Field of Search ........... 60/54.5 P, 54.6 P, 54.5 E, 60/54.6 E; 91/391, 6, 33, 431; 137/113

[56] References Cited

UNITED STATES PATENTS

| | | | |
|---|---|---|---|
| 2,945,352 | 7/1960 | Stelzer | 60/54.6 P |
| 3,407,894 | 10/1968 | Thompson et al. | 137/113 |
| 3,357,310 | 12/1967 | Rohde | 91/6 |
| 3,353,451 | 11/1967 | Garrison et al. | 60/51 |

FOREIGN PATENTS OR APPLICATIONS 606,206   10/1960   Canada ............................ 60/54.6 P Primary Examiner—Edgar W. Geoghegan
Assistant Examiner—A. M. Zupcic
Attorney—Ken C. Decker and Plante, Hartz, Smith & Thompson

[57] ABSTRACT

A hydraulic brake booster is disclosed which is provided with an inlet port which communicates with the outlet of the vehicle power steering pump and an outlet port which communicates with the inlet of the vehicle's power steering gear. A ball valve within the booster housing admits fluid pressure into the high pressure section of a pressure chamber to operate a piston which applies the brakes of the vehicle. A shuttle valve is provided within the booster housing which normally permits substantially uninhibited flow of fluid between the inlet and outlet, but which restricts flow of fluid therebetween when the ball valve is opened. A flow-sensitive switch senses a malfunction in the vehicle's power steering pump and actuates an auxiliary electric motor pump when the vehicle's power steering pump malfunctions. When this occurs the shuttle valve is shifted to a position permitting fluid communication between the electric motor pump and the booster pressure chamber, but preventing flow of fluid between the pressure chamber and the booster inlet or outlet.

8 Claims, 1 Drawing Figure

PATENTED JAN 23 1973 3,712,176
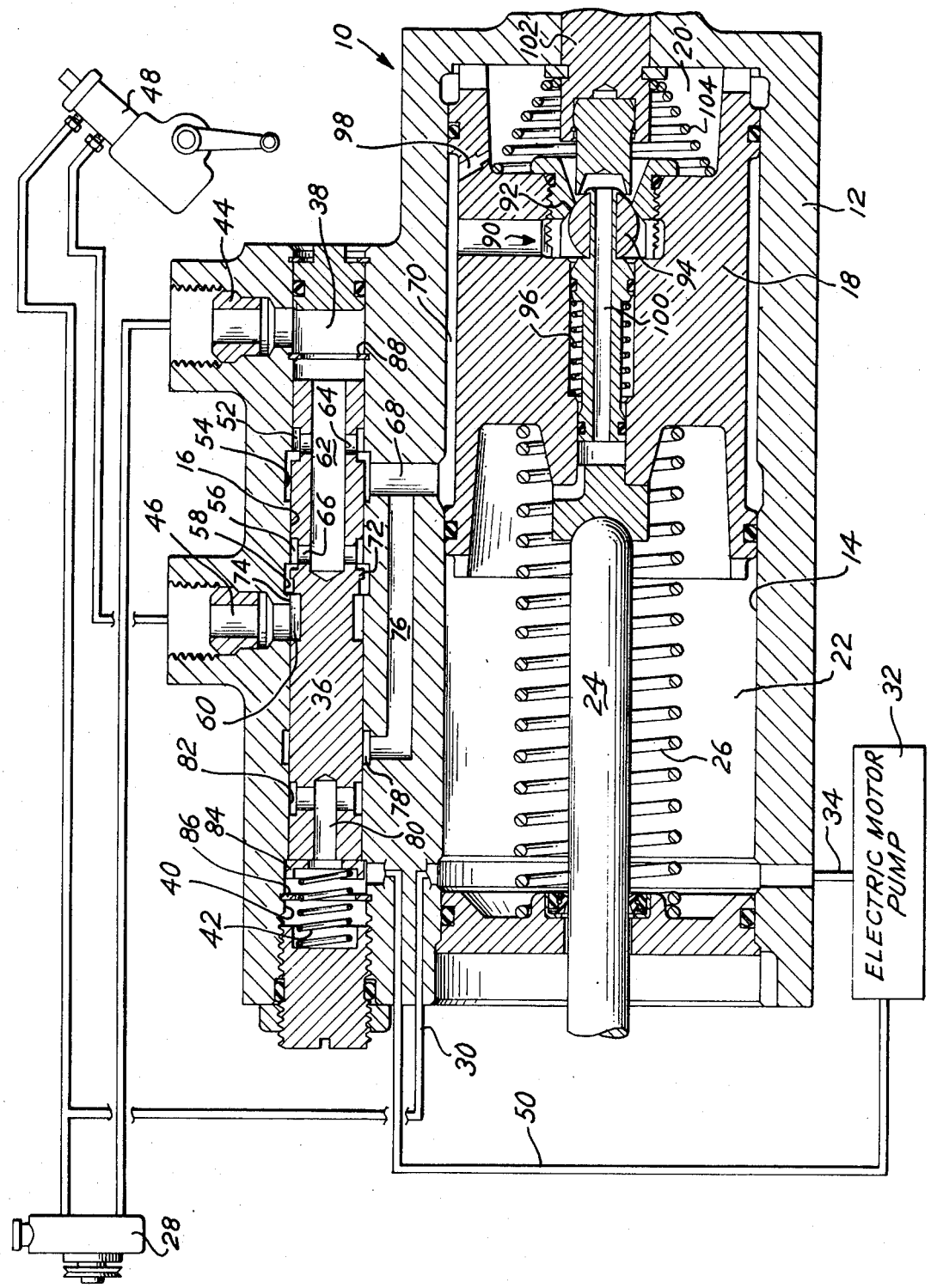
INVENTOR
ROBERT E. MEYERS
BY
Ken C. Decker
ATTORNEY 3,712,176

SHUTTLE VALVE FOR HYDRAULIC BRAKE BOOSTER WITH EMERGENCY FLUID SUPPLY

BACKGROUND OF THE INVENTION

Hydraulic brake boosters used on relatively large vehicles must be provided with an auxiliary fluid supply such as an electric motor pump, in order to provide a power assist to a vehicle operator during a malfunction of the vehicle's power steering pump which normally supplies pressurized fluid to the brake booster, or when the vehicle's engine ceases to operate while the vehicle is in motion. In the booster of the so-called "open-center" design, hydraulic fluid normally flows to the booster and to the vehicle's power steering gear from the power steering pump. However, when the electric motor pump is actuated, fluid communication between the booster and the power steering gear must be terminated, because the capacity of the electric motor pump is not sufficient to power both the booster and the power steering gear. Also, even when the power steering pump is functioning normally, flow of fluid through the brake booster must be restricted momentarily when a brake application is effected to supply the necessary high pressure fluid to the booster pressure chamber.

SUMMARY OF THE INVENTION

Therefore, an important object of my invention is to supply a hydraulic brake booster with an auxiliary fluid supply in which communication between the booster and other fluid appliances in the vehicle's primary hydraulic circuit is terminated when the auxiliary fluid supply is used.

Another important object of my invention is to provide a single valve which not only terminates fluid communication between the booster pressure chamber and the primary hydraulic circuit of the vehicle hydraulic system when the auxiliary fluid supply is actuated, but which also functions to restrict flow of fluid between the booster inlet and outlet ports when the vehicle's hydraulic systems are functioning normally and brake application is effected.

Another important object of my invention is to minimize the size and capacity of the auxiliary fluid supply required to operate the brake booster when the vehicle's power steering pump malfunctions.

DESCRIPTION OF THE DRAWINGS

The sole FIGURE of the drawings is a schematic illustration of a vehicle hydraulic system with a brake booster made pursuant to my present invention illustrated in cross section.

DETAILED DESCRIPTION

Referring now to the drawings, a brake booster generally indicated by the numeral 10 includes a housing 12 defining a pressure chamber 14 and a bore 16 therewithin. A boost piston 18 is slidably mounted in the pressure chamber 14, and divides the latter into a high pressure section 20 between one end of the piston 18 and the corresponding end of the pressure chamber 14 and a low pressure section 22 between the other end of the piston 18 and the other end of the bore. A rod 24 interconnects the other end of the piston 18 with a standard automotive master cylinder (not shown), which is mounted to the left of the booster housing 12. Movement of the piston 18 to the left viewing the FIGURE develops pressure in the master cylinder in the normal manner to apply the brakes of the vehicle. A return spring 26 yieldably urges the piston 18 toward the right viewing the FIGURE, toward the brake release position. The low pressure section 22 of the pressure chamber 14 is communicated to the low pressure side or inlet of the vehicle's power steering pump 28 by a conduit 30. The low pressure section 22 is also communicated with the inlet of an electric motor-driven pump 32 by a conduit 34. A flow sensing switch 35 is provided to sense lack of flow from the pump 28 and to actuate pump 32 in response thereto.

A spool valve 36 is slidably mounted in the bore 16. Variable volume chambers 38 and 40 are defined between opposite ends of the spool valve 36 and corresponding ends of the bore 16. A spring 42 mounted in the chamber 40 yieldably urges the spool valve 36 toward the position illustrated in the drawing. A fluid inlet 44 communicates the outlet or high pressure side of the power steering pump 28 with the variable volume chamber 38 and an outlet port 46 communicates the bore 16 with the inlet of the vehicle's power steering gear 48. A conduit 50 communicates the outlet or high pressure side of the electric motor pump 32 with the variable volume chamber 40. The power steering pump 28 and gear 48 comprise the vehicle's primary fluid circuit and the electric motor pump 32 comprises the vehicle's secondary hydraulic circuit.

The wall of the bore 16 and the outer circumferential surface of the spool valve 16 are provided with spaced grooves and lands that cooperate with one another to define annular fluid cavities 52, 54, 56, 58, and 60. Axially extending channel 62 and radially extending openings 64 in the spool valve 36 communicate the chamber 38 with the cavity 52, and the axial channel 62 and radial openings 66 communicate the chamber 38 with the cavity 56. A fluid passage 68 communicates the cavity 54 with an annular compartment 70 defined between the outer circumferential surface of the piston 18 and the wall of the pressure chamber 14. The cavity 60 communicates with the outlet 46, and a raised land 72 on the spool valve 36 cooperates with an inwardly extending land 74 on the wall of the bore 16 to define a metering orifice therebetween as the spool valve 36 is shifted to the left to progressively restrict flow of fluid between the cavities 58 and 60.

Another passage 76 communicates an annular groove 78 in the wall of the bore 16 with the passage 68. Fluid channels 80 provided within the spool valve 36 communicates an annular groove 82 in the outer circumferential surface of the latter with the variable volume chamber 40. The spool valve 36 may be shifted to the left from the position illustrated in the drawing until the caging member 84 which is engaged with the end of the spool valve 36 engages the stop ring 86. Similarly, the spool valve 36 may be shifted to the right viewing the FIGURE until the other end of the spool valve 36 engages the stop ring 88.

Passage means indicated generally by the numeral 90 communicates the annular chamber 70 with the high pressure section 20 of the pressure chamber 14. A valve seat 92 is provided in the passage means 90, and a ball valve 94 is yieldably urged into sealing engagement with the seat 92 by a spring 96 so that fluid communication past the ball valve 94 is normally prevented. However, some fluid is permitted to flow between the chamber 70 and the section 20 even when the brakes are released through a small orifice 98. However, this small amount of fluid flow is not sufficient to move the piston, since the section 20 is vented to the section 22 when the brakes are released through a passage 100 through the ball valve 94.

One end of a valve operating member 102 is adapted to engage the ball valve 94 is illustrated in the drawing, and the other end of the member 102 (not shown) is connected to the usual brake pedal (not shown) mounted in the vehicle operator's compartment. When a brake application is effected by urging the member 102 to the left, communication through the passage 100 is terminated, and the ball valve 94 is urged off the seat 92 to communicate the high pressure fluid into the chamber 20.

MODE OF OPERATION

The brake booster 10 is illustrated in the drawing with the various components thereof disposed in the position that they assumed when the brakes of the vehicle are released and when the vehicle power steering pump 28 is functioning normally. In this position, fluid from the outlet of the power steering pump 28 flows through the inlet port 44 into the chamber 38 and into the axial channel 62. A portion of the fluid flows from the axial channel 62 through the opening 64, the annular grooves 52 and 54, and the passage 68 into the annular chamber 70. The rest of the fluid flows through the radial openings 66 and the grooves 56, 58, and 60 to the outlet 46. Fluid in the annular chamber 70 flows through the orifice 98 into the high pressure section 20 of the pressure chamber 14. Since the orifice 98 restricts flow of fluid therethrough, fluid pressure level in the section 20 is less then the fluid pressure level in the annular chamber 70. However, fluid pressure in the section 20 is insufficient to shift the piston 18, since as long as the vehicle's brakes are released, fluid may flow from the high pressure section 20 into the low pressure section 22 through the passage 100 extending through the valve 94. Fluid in the low pressure section 22 is vented to the low pressure side for inlet pump 28 through the conduit 30.

When a brake application is effected, the valve operating member 102 is urged to the left viewing the drawing. When the member 102 is moved a relatively short distance the end of the latter seemingly engages the ball valve 94 to prevent fluid communication between the section 20 and the section 22 through the passage 100. Since fluid continuously flows into the section 20, closure of the passage 100 will increase the fluid pressure level in the high pressure section 20. This increased pressure level will be communicated to the chamber 38, and will also initiate movement of the piston 18 to the left viewing the FIGURE. The increased fluid pressure level in the chamber 38 acting on the right hand side of the spool valve 36 will urge the latter to the left, viewing the drawing, moving the land 72 closer to the land 74 so that the latter defines a flow restricting orifice therebetween. Since flow of fluid between the grooves 58, and 60 is impeded, the fluid pressure level in the axial channel 62 and in the chamber 38 increases. This increase in fluid pressure level is communicated to the left side of the valve seat 92 through the opening 64, the annular cavity 52 and 54, the passage 68, the annular chamber 70, and the passage means 90. Further movement of the valve operating member 102 urges the ball valve 94 away from the seat 92 to permit communication of high pressure fluid into the high pressure section 20. Fluid in the section 20 acts upon the right hand side of the piston 18 to urge the latter to the left viewing the FIGURE. Movement of the piston 18 is transmitted to the aforementioned master cylinder by the rod 24 to operate the master cylinder in the normal manner to develop braking pressure in the brakes of the vehicle. When the vehicle operator releases the brake pedal, the spring 104 urges the valve operating member 102 to the right. When this occurs, the spring 96 urges the ball valve 94 back into sealing engagement with the valve seat 92 to prevent fluid communication into the high pressure section 20 through the passage means 90. When the end of the valve operating member 102 moves away from the ball valve 94, fluid communication is initiated between the high pressure section 20 and the low pressure section 22 through the passage 100. Since the low pressure section 22 is vented to the low pressure side of the pump 28 by the conduit 30, the fluid pressure level in the high pressure section 20 is quickly reduced. The return spring 26 then urges the piston 18 to the right viewing the FIGURE, toward the brake release position.

Since the power steering pump 28 is powered by the engine of the vehicle, the power steering pump 28 will cease operation immediately if the vehicle engine dies. This can produce a very dangerous situation if the engine dies while the vehicle is descending a steep grade. Therefore, an auxiliary electric pump 32 is provided to furnish high pressure fluid to operate the brake booster 10 when the power steering pump 28 fails to produce high pressure fluid. When this occurs, the aforementioned sensing device 35 actuates the electric motor pump 32. When this occurs, high pressure fluid is communicated from the pump 32 into the chamber 40 through the conduit 50. Fluid in the chamber 40 acts against the left hand of the spool valve 36 to urge the latter to the right viewing the drawing until the other end of the spool valve 36 engages the ring 88. This movement of the spool valve 36 is sufficient to communicate the annular groove 82 with the annular groove 78, thereby permitting flow of fluid between the chamber 40 and the annular chamber 70 through the channels 80, the grooves 78 and 82, and the passages 76 and 68. Fluid in the annular chamber 70 operates the brake booster and in the normal manner is described above. It should be noted that when the spool valve 36 is disposed in the position in which the right hand end of the latter engages the ring 88, communication between the grooves 52 and 54 and between the grooves 56 and 58 is terminated. Therefore, fluid from the electric motor pump 32 cannot flow out of the outlet 46 or the inlet 44, and the entire capacity of the pump 32 is available to operate the brake booster. This feature permits a much smaller pump 32 to be used as compared to devices known in the prior art.

I claim:

1. In a vehicle hydraulic system having a primary hydraulic circuit with a primary pressure source, a second hydraulic circuit with a secondary pressure source, and means for sensing a malfunction in said primary pressure source and actuating said secondary pressure source, a brake booster in fluid communication with each of said circuits comprising:

a housing having an inlet and outlet communicated with said primary hydraulic circuit and a pressure chamber;

a piston slidably mounted in said pressure chamber;

first valve means for controlling fluid communication into said pressure chamber for shifting said piston;

second valve means controlling fluid communication between the inlet, the outlet, and the first valve means;

said second valve means being operable to terminate fluid communication between the inlet, the outlet, and the first valve means and initiating fluid communication between the first valve means and the secondary pressure source upon actuation of the latter by said sensing means;

a bore communicating the inlet with the outlet;

said second valve means being a spool valve slidably mounted in said bore and shiftable from a first position permitting substantially uninhibited flow of fluid between the inlet and outlet to a second position upon opening of the first valve means;

said spool valve in second position restricting flow of fluid between the inlet and outlet to increase the pressure level in said bore; and passage means communicating said bore with the pressure chamber, said first valve means being mounted in said passage means.

2. In a vehicle hydraulic system having a primary hydraulic circuit with a primary pressure source, a secondary hydraulic circuit with a secondary pressure source, and means for sensing a malfunction in said primary pressure source and actuating said secondary pressure source, a brake booster in fluid communication with each of said circuits comprising;

a housing having an inlet and outlet communicated with said primary hydraulic circuit and pressure chamber;

a piston slidably mounted in said pressure chamber;

first valve means for controlling fluid communication into said pressure chamber for shifting said piston;

second valve means controlling fluid communication between the inlet, the outlet, and the first valve means;

said second valve means being operable to terminate fluid communication between the inlet, the outlet, and the first valve means and initiating fluid communication between the first vale means and the secondary pressure source upon actuation of the latter by said sensing means;

a bore communicating the inlet with the outlet;

passage means communicating said bore with said pressure chamber;

said first valve means controlling flow of fluid through said passage means;

said second valve means being slidably mounted in said bore and shiftable from a first position permitting substantially unrestricted flow of fluid in said primary hydraulic circuit to a second position restricting flow of fluid therethrough to force pressurized fluid into said passage means, said secondary pressure source forcing said second valve means to a third position terminating fluid communication between said primary hydraulic system and said passage means and initiating fluid communication between said secondary hydraulic circuit and said passage means.

3. The invention of claim 2:

said second valve means being a spool valve slidably mounted in said bore, the end of the spool cooperating with the end of the bore to define a variable-volume chamber therebetween;

said second hydraulic circuit being communicated into said variable volume chamber to permit fluid pressure from said secondary source to act against the end of said spool valve to urge the latter toward said third position when said secondary source is actuated.

4. The invention of claim 3; and conduit means communicating said variable volume chamber with said passage means;

said spool valve being operable to initiate fluid communication through said conduit means when the spool valve is disposed in said third position, said spool valve terminating fluid communication through said conduit means when the spool valve is shifted away from said third position.

5. The invention of claim 2:

said piston dividing said pressure chamber into a high pressure section and a low pressure section between opposite ends of the housing and corresponding ends of the piston;

said low pressure section being vented to a fluid reservoir;

said passage means communicating with said high pressure section;

other passage means communicating said high pressure section to said low pressure section; and operator-actuated means for closing said other passage means and thereafter opening said first valve means to admit pressurized fluid into said high pressure section for shifting said piston.

6. The invention of claim 5; and an orifice extending through said piston communicating said passage means to said high pressure section to provide a flow path between the inlet and the reservoir through the pressure chamber when the brakes of the vehicle are released.

7. The invention of claim 6:

said second valve means being a spool valve slidably mounted in said bore, one end of said spool valve cooperating with a corresponding end of the bore to define a variable volume cavity therebetween;

said inlet port being communicated with said variable volume cavity therebetween;

said inlet port being communicated with said variable volume cavity; and channel means extending through the spool valve communicating said variable cavity with said outlet and with said passage means;

said spool valve being shifted to said second position by fluid pressure in said variable volume cavity acting upon said one end of the spool valve upon increase of the fluid pressure level communicated to said variable volume cavity from said high pressure section when the operator-operated means prevents flow of fluid through said other passage means when a brake application is effected.

8. The invention of claim 7:
said first valve means being mounted with said piston;
said passage means including an annular compartment defined between the outer circumferential surface of the piston and the wall of the bore, a first passage communicating the annular compartment with said bore, and a second passage within said piston communicating said annular compartment with said high pressure section;
said first valve means being mounted within said second passage.

* * * * *